US012586070B2

(12) United States Patent
Maibach

(10) Patent No.: US 12,586,070 B2
(45) Date of Patent: Mar. 24, 2026

(54) CRYPTOCURRENCY MANAGEMENT SYSTEMS AND METHODS WITH WIRELESS ACTIVATION

(71) Applicant: Block, Inc., Oakland, CA (US)

(72) Inventor: Matthew H. Maibach, Berkeley, CA (US)

(73) Assignee: Block, Inc., Oakland, CA (US)

( * ) Notice: Subject to any disclaimer, the term of this patent is extended or adjusted under 35 U.S.C. 154(b) by 113 days.

(21) Appl. No.: 18/382,363

(22) Filed: Oct. 20, 2023

(65) Prior Publication Data

US 2024/0144233 A1 May 2, 2024

Related U.S. Application Data

(63) Continuation-in-part of application No. PCT/US2023/029739, filed on Aug. 8, 2023.
(Continued)

(51) Int. Cl.
*G06Q 20/40* (2012.01)
*G06K 19/07* (2006.01)
(Continued)

(52) U.S. Cl.
CPC ... *G06Q 20/40145* (2013.01); *G06K 19/0718* (2013.01); *G06Q 20/3278* (2013.01);
(Continued)

(58) Field of Classification Search
CPC ........ H04B 5/79; H04B 5/45; G06K 19/0718; H04L 9/3255; H04L 9/50; H04L 2209/56;
(Continued)

(56) References Cited

U.S. PATENT DOCUMENTS 6,834,112 B1 12/2004 Brickell
8,832,788 B1 9/2014 Gibson et al.
(Continued)

FOREIGN PATENT DOCUMENTS

CN 106778702 A 5/2017
CN 206684749 U 11/2017
(Continued)

OTHER PUBLICATIONS

Timothy B. Lee, "Bitcoin Has a Huge Scaling Problem—Lightning Could be the Solution", Feb. 4, 2018, Ars Technica, pp. 1-28.

*Primary Examiner* — Jalatee Worjloh
(74) *Attorney, Agent, or Firm* — Polsinelli PC

(57) ABSTRACT

A cryptocurrency management device (CMD) may be used to perform various cryptocurrency management functions, such as storage of cryptocurrency, user authentication, and initiation or processing of a transaction for transferring cryptocurrency. To conserve the power resources of the CMD, components of the CMD may be transitioned to a sleep state for extended periods of time. Such components may be automatically activated by a user touching the CMD or bringing a wireless communication device within range of the CMD. The circuitry of the CMD that triggers the activation are capable of continuously monitoring for such inputs over extended periods of time without consuming significant amounts of power, thereby conserving the power resources of the CMD.

20 Claims, 11 Drawing Sheets

Related U.S. Application Data

(60) Provisional application No. 63/419,619, filed on Oct. 26, 2022.

(51) Int. Cl.
*G06Q 20/06* (2012.01)
*G06Q 20/32* (2012.01)
*G06Q 20/38* (2012.01)

(52) U.S. Cl.
CPC ..... *G06Q 20/3823* (2013.01); *G06Q 20/3829* (2013.01); *G06Q 20/0658* (2013.01)

(58) Field of Classification Search
CPC .......... H04L 2209/805; G06Q 20/3829; G06Q 20/0655; G06Q 20/3278; G06Q 20/3823; G06Q 20/40145; G06Q 20/0658; G06F 21/32; G06F 21/35; G06F 21/64
See application file for complete search history.

(56) References Cited

U.S. PATENT DOCUMENTS

| | | | |
|---|---|---|---|
| 2009/0024533 A1 | 1/2009 | Fernandes et al. | |
| 2015/0019892 A1 | 1/2015 | Agrawal et al. | |
| 2015/0310424 A1 | 10/2015 | Myers | |
| 2015/0324789 A1 | 11/2015 | Dvorak et al. | |
| 2016/0203572 A1 | 7/2016 | McConaghy et al. | |
| 2017/0103391 A1 | 4/2017 | Wilson et al. | |
| 2018/0331414 A1 | 11/2018 | Tunnell et al. | |
| 2019/0068247 A1 | 2/2019 | Hueber et al. | |
| 2019/0213586 A1 | 7/2019 | Baratam | |
| 2019/0244207 A1 | 8/2019 | Samuel | |
| 2019/0325408 A1* | 10/2019 | Goroff | G06Q 20/3825 |
| 2020/0019937 A1 | 1/2020 | Edwards et al. | |
| 2022/0057519 A1* | 2/2022 | Goldstein | G01S 17/88 |
| 2022/0255945 A1 | 8/2022 | Guan et al. | |
| 2023/0153276 A1 | 5/2023 | Reinsberg et al. | |
| 2023/0155839 A1 | 5/2023 | Kreder et al. | |
| 2024/0037542 A1 | 2/2024 | Lanman et al. | |
| 2024/0144272 A1 | 5/2024 | Maibach | |

FOREIGN PATENT DOCUMENTS

| | | | | |
|---|---|---|---|---|
| CN | 110225042 A | 9/2019 | | |
| WO | 86/03315 A1 | 6/1986 | | |
| WO | WO-2021019056 A1 * | 2/2021 | | G06F 21/32 |
| WO | 2024/035707 A1 | 2/2024 | | |
| WO | 2024/091433 A1 | 5/2024 | | |

* cited by examiner

203

207

208

CRYPTOCURRENCY MANAGEMENT SYSTEMS AND METHODS WITH WIRELESS ACTIVATION

CROSS REFERENCE TO EARLIER APPLICATION

The present application is a continuation-in-part and claims the benefit under 35 U.S.C. 111(a) of PCT Application Number PCT/US23/29739 filed on Aug. 8, 2023, entitled "Cryptocurrency Management Systems and Methods," the entirety of which is incorporated herein by reference. This application also claims priority to Provisional Application No. 63/419,619 filed on Oct. 26, 2022, entitled "Cryptocurrency Management Systems and Methods with Wireless Activation," the entirety of which is incorporated herein by reference.

TECHNICAL FIELD

Cryptocurrency, such as Bitcoin, is increasing in popularity and has many advantages. In this regard, cryptocurrency provides a digital form of currency that may be transferred from one party to another through a global computer network, such as the Internet, thereby facilitating the storage and transfer of financial assets for financial transactions.

Users of cryptocurrency often face a choice between third-party custody and self-custody. In third-party custody, the owner depends on a third party to hold information, such as private keys, that are used in establishing ownership and transferring cryptocurrency. Such a solution may be appealing to users who do not wish to be burdened with many of the complexities of holding, processing, and transferring information related to the cryptocurrency. However, many users may be concerned about the security measures used by third-party custodians to keep the cryptocurrency secure and also retaining the ability to access the cryptocurrency from the third-party custodians, such as during bankruptcy or other unanticipated events, as well as the loss of credentials required by the third-party custodians.

With self-custody, the owner typically must wade through the technical complexities associated with managing cryptocurrency and also deal with security concerns. Techniques and devices for facilitating and improving management of cryptocurrency are generally desired, particularly in situations involving self-custody. Further, many devices for assisting users in self-custody applications may be infrequently used, and it is desirable for such devices to remain operational for extended periods of times, such as many years.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to system and methods for managing and using digital financial assets, such as cryptocurrency. In some embodiments of the present disclosure, a cryptocurrency management system has a cryptocurrency management device (CMD) that may be used for self-custody of cryptocurrency assets, thereby assisting users in managing cryptocurrency transactions and assets. As an example, the CMD may be configured to store cryptocurrency and at least one private key for use in generating an authenticating signature for a multi-signature address of cryptocurrency networks. During a transaction for transferring cryptocurrency, the private key along with one or more private keys from other sources may be used to generate an authenticating signature for transfer of the cryptocurrency stored in the CMD.

In some embodiments, the CMD has a fingerprint sensor for use in authenticating the authorized user. The fingerprint sensor is coupled to a touch sensor that is configured to sense when a user's finger touches or is positioned near the fingerprint sensor at which time the fingerprint sensor is awakened. Thus, the fingerprint sensor, as well as other components of the CMD, may be kept in a sleep state for an extended period of time to conserve electrical power, and such components may then be automatically awoken when the user touches the fingerprint sensor without the user having to provide a separate input to turn on the CMD or the fingerprint sensor.

To provide an alternative to sensing the user's finger, the CMD may use wireless communication, such as near field communication (NFC), to awaken components of the CMD or authenticate the user. For example, an antenna may be coupled to rectification circuitry that is configured to convert a signal (e.g., an NFC signal) received by the antenna into an activation signal that is then used to activate (e.g., awaken) one or more components of the CMD, such as a processor and communication circuitry used to transmit and receive signals via the antenna. Thus, the act of bringing a wireless communication device (e.g., an NFC device) within range of the antenna has the effect of triggering activation of one or more components of the CMD. Thereafter, crypto-currency management operations, such as user authentica-tion or initiation or processing of a transaction for transfer-ring cryptocurrency, may be performed based on communication between the CMD and the wireless com-munication device or other device.

Figure 1:
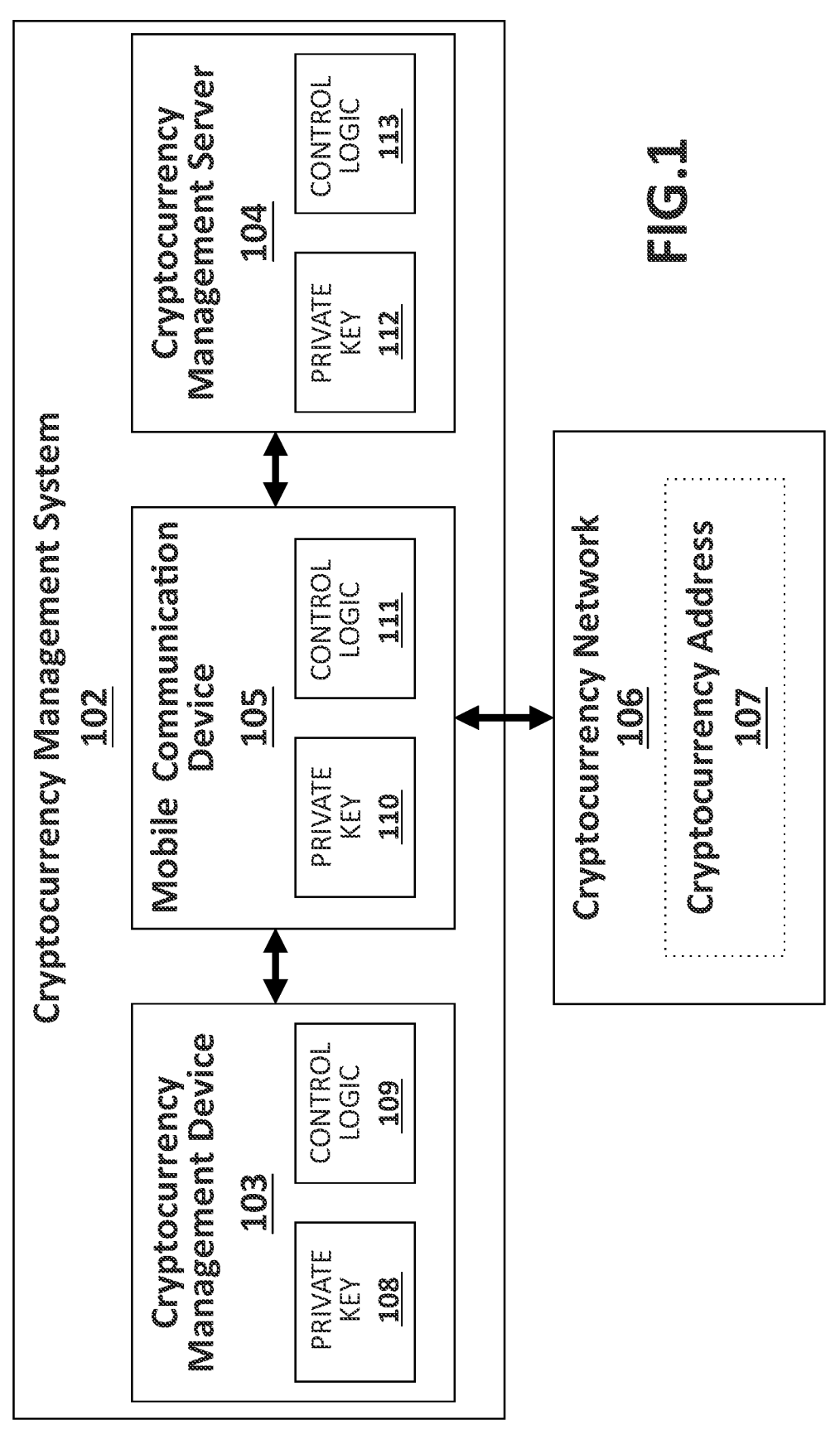
FIG. 1 is a block diagram illustrating a cryptocurrency management system, according to an exemplary embodiment of the present disclosure.

FIG. 1 is a simplified block diagram of a cryptocurrency management system 102. As shown by the figure, a cryp-tocurrency management system 102 may comprise a cryp-tocurrency management device (CMD) 103, a cryptocur-rency management server (CMS) 104, and a mobile communication device (MCD) 105.

The MCD 105 can be any mobile device capable of processing data and transactions as described herein. The MCD 105 may have a communication interface, such as a cellular transceiver that permits the MCD 105 to commu-nicate with a network, such as a cellular network, Wi-Fi network, the Internet, or other networks or combinations of networks. The MCD 105 may also have a short-range communication interface, such as a near field communica-tion (NFC) or Bluetooth transceiver, for enabling wireless communication with other devices close to the MCD 105. In some embodiments, the MCD 105 is implemented as a smartphone, but other types of mobile devices, such as a laptop or other type of hand-held device, are possible.

The CMD 103 may be any type of computing device capable of processing data and transactions as described herein. The CMD 103 may be a stand-alone mobile device or other type of device, such as a desktop device that is not designed for mobility. Although the CMD 103 in some embodiments may have a communication interface for enabling communication with a network, it may be designed in other embodiments for enabling only short-range com-munication, such as NFC or Bluetooth, or via a direct wired connection, so that hackers are unable to access the CMD 103 from a remote location using a network, thereby enhanc-ing security of the CMD 103 and the data stored therein.

Also shown by FIG. 1 is a cryptocurrency network 106 and a cryptocurrency address 107 associated with (one or more transactions in) the cryptocurrency network 106. In general, the MCD 105 may interact with the CMD 103 and the CMS 104 to, among other things, generate and submit valid cryptocurrency transactions. As part of this process, the MCD 105 may also interact with the cryptocurrency network 106.

In general, each of the devices 103, 104, and 105 may also comprise a cryptocurrency account (CA) private key (i.e., CA private keys 108, 110, and 112) and control logic (i.e., control logic 109, 111, and 113). As described further below, each private key 108, 110, and 112 is a cryptographic key associated with the private key of the public-private key pair (the private key of one of the public-private key pairs, for multi-signature addresses) of a cryptocurrency address (e.g., cryptocurrency address 107). As also described further below, the control logics 109, 111, and 113 may contain instructions that can be executed by their device's respective processor or set of processors to perform various functions of that device.

At a high level, the cryptocurrency management system 102 works to manage the cryptocurrency address 107 by controlling use of the cryptocurrency funds associated with the cryptocurrency address 107 in a transaction. In this regard, the cryptocurrency management system 102 can be thought of as an association of devices or systems that (1)

each have been distributed a portion of the authority to control the cryptocurrency address 107 and (2) are config-ured to cooperate with one another to use their collective authority to control (e.g., generate and submit a transaction involving) the cryptocurrency address 107. In other words, the ability to manage the cryptocurrency address 107 may be split between the CMD 103, the CMS 104, and the MCD 105. In some embodiments, a plurality of the CMD 103, the CMS 104, and the MCD 105 communicate with one another and agree to a transaction before the signatures for the transaction are obtained and an authenticated transaction is generated and submitted to the cryptocurrency network 106.

In some embodiments, the cryptocurrency address 107 is a multi-signature address whose private keys are used as the authenticating key shares distributed across the CMD 103, CMS 104, or the MCD 105. As an example, there may be three private keys associated with the cryptocurrency address 107 and each of the CMD 103, the CMS 104, and the MCD 105 may store a respective one of them, and each of the CMD 103, the CMS 104, and the MCD 105 may permit access to its private key only if the user is able to provide acceptable authentication credentials. Further, the cryptocurrency address 107 may be configured such that any two of the private keys can be used to generate a fully authenticated cryptocurrency transaction request for the cryptocurrency asset associated with the cryptocurrency address 107. In other embodiments, other numbers of private keys may be used to generate a fully authenticated crypto-currency transaction request.

In some embodiments, the owner of the cryptocurrency asset associated with the address 107 may maintain physical possession of the CMD 103 and the MCD 105, whereas the CMS 104 is maintained by a trusted third party. Further, the owner may keep the CMD 103 in a secure location, such as at home. Thus, if the MCD 105 is stolen, an unauthorized user should be unable to use the MCD 105 to generate a fully authenticated cryptocurrency transaction involving the cryp-tocurrency assets associated with the cryptocurrency address 107 since the unauthorized user (1) would not have physical access to or be able to communicate with the CMD 103 (which may be designed to permit only short-range com-munication, as described above) and (2) would be unable to access the private key stored at the CMS 104 without providing valid authentication credentials to the CMS 104.

In addition, when the owner desires to initiate a transac-tion, the owner may bring the MCD 105 to the CMD 103 or the CMD 103 to the MCD 105 so that the CMD 103 and the MCD 105 may communicate to generate a fully authenti-cated cryptocurrency transaction. In this regard, after pro-viding valid authentication credentials to the CMD 103, the MCD 105 may use the private key stored therein to generate an authenticating signature that is communicated to the CMD 103, and the CMD 103 may use the private key stored therein to generate an authenticating signature that can be combined with the authenticating signature from the MCD 105 in order to generate a fully authenticated request for a cryptocurrency transaction. The CMD 103 may then trans-mit such request to the cryptocurrency network 106. Thus, using the devices (i.e., the CMD 103 and MCD 105) within the owner's physical possession, he or she is able to generate a fully authenticated cryptocurrency transaction without use of the CMS 104, thereby giving the owner full control over the cryptocurrency transaction in the event that the CMS 104 becomes unavailable for any reason. However, the CMS 104 remains available for recovery in the event that the CMD 103 and/or the MCD 105 is lost, stolen, fails, or otherwise is unavailable.

Specifically, if the original MCD 105 is lost or otherwise becomes unavailable, the original MCD 105 may be replaced with a new MCD 105 that may communicate with the CMD 103 and the CMS 104 to obtain two authenticating signatures that may be combined to form a fully authenticated cryptocurrency transaction. Also, if the CMD 103 is lost or otherwise becomes unavailable, the MCD 105 may communicate with the CMS 104 (as described above for the CMD 103) to obtain an authenticating signature that may then be combined with an authenticating signature from the MCD 105 to generate a fully authenticated cryptocurrency transaction. Thus, the embodiment shown by FIG. 1 and described above provides flexibility to the owner while maintaining security and also permitting recovery in the event of a loss of any of the CMD 103, CMS 104, or the MCD 105.

Figure 2:
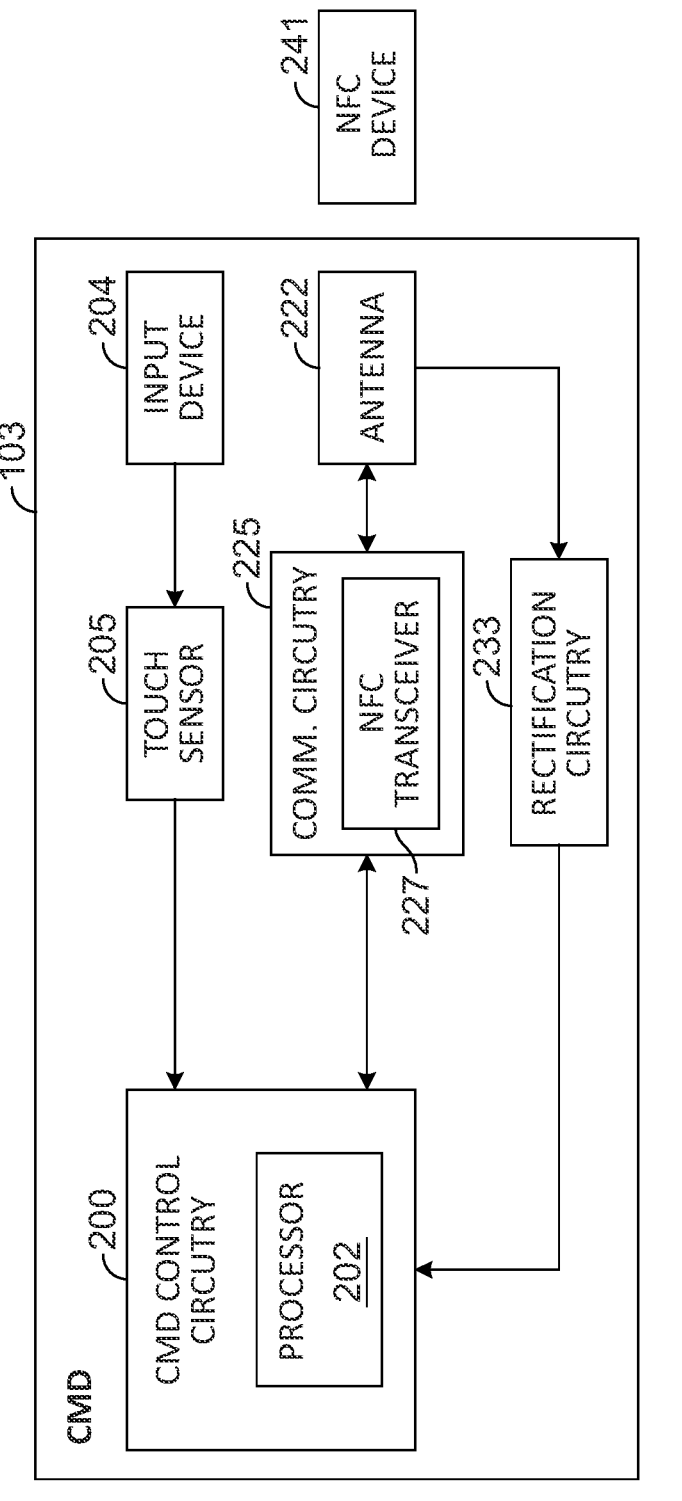
FIG. 2 is a block diagram illustrating an exemplary embodiment of cryptocurrency management device (CMD), such as is depicted by FIG. 1.

FIG. 2 shows an embodiment of the CMD 103. As shown by FIG. 2, the CMD 103 comprises circuitry 200, referred to herein as "CMD control circuitry," that is configured to control the operation of the CMD 103. The CMD control circuitry 200 may be implemented in hardware or a combination of hardware and software. As an example, as shown by FIG. 2, the CMD control circuitry 200 may comprise at least one processor 202, such as a digital signal processor (DSP) or computer processing unit (CPU), programmed with software that when executed by the processor 202 causes the processor 202 to perform functions ascribed to the CMD 103. In other embodiments, other configurations of the CMD control circuitry 200 are possible.

As shown by FIG. 2, the CMD 103 has an antenna 222 that is electrically coupled to the CMD control circuitry 200 (e.g., the processor 202) through communication circuitry 225. The antenna 222 is configured to communicate wirelessly with external devices, such as the MCD 105 shown by FIG. 1. In some embodiments, the antenna 222 may be used to communicate short-range signals, such as Bluetooth or NFC signals. For illustrative purposes, it is will be assumed hereafter unless otherwise indicated that the antenna 222 is configured to communicate NFC signals, but it should be emphasized that the antenna 222 may be used to communicate other types of wireless signals in other embodiments.

The communication circuitry 225 is configured to process signals to be transmitted by the antenna 222 (e.g., drive the antenna 222) or signals received by the antenna 222. As an example, when the antenna 222 is used for NFC, the communication circuitry 225 may comprise an NFC transceiver 227 that is configured to process NFC signals to be transmitted from or received by the antenna 222. The communication circuitry 225 may also include various analog circuitry, sometimes referred to as "front end" circuitry, such as filters and amplifiers, for processing NFC signals communicated by the antenna 222. In some embodiments, the NFC transceiver 227 is implemented as an integrated circuit (IC) or "chip," but other configurations of the NFC transceiver 227 are possible.

Figure 3:
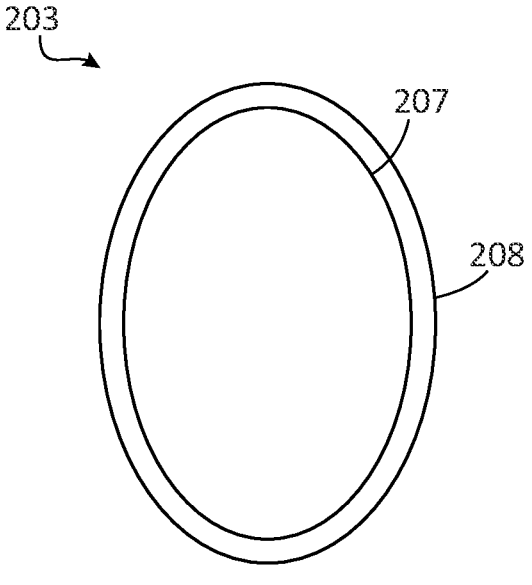
FIG. 3 depicts an exemplary embodiment of an input device of a CMD, such as is depicted by FIG. 2.

As noted above, the CMD 103 may be configured to authenticate a user requesting a management operation (e.g., transfer of cryptocurrency) before allowing the management operation to occur. The exemplary embodiment of the CMD 103 shown by FIG. 2 has an input device 204 for receiving a user input that may be used to authenticate the user. In some embodiments, as shown by FIG. 3, the input device 204 comprises a fingerprint sensor 203 for capturing an image of user's fingerprint, which may be used for authentication according to fingerprint matching techniques known in the art. In this regard, the sensor 203 may have a surface 207 that the user touches with his or her fingertip during fingerprint capture. Such surface may be transparent so that the user's fingerprint is visible through the surface 207 for capture by a camera (not shown) of the fingerprint sensor 203. In other embodiments, the input device 204 may comprise other types of components for receiving other types of user inputs.

Note that, in some embodiments, the circuitry of the CMD 103 may be powered by a battery, which has a finite amount of available power, and over time, the fingerprint sensor 203 and other components of the CMD 103 may utilize a significant amount of the available energy stored in the battery. Further, the CMD 103 may be in operation over an extended period of time (e.g., months or years) for which it is desirable to extend the useful life of the CMD's battery. It is possible for the fingerprint sensor 203 to be continuously powered so that it can capture a fingerprint at any time. However, such continuous power may needlessly usurp a significant amount of power particularly during periods when the CMD 103 is infrequently used. Indeed, some users may go for long periods of time, such as months or years, without using the CMD 103 to authorize a transaction or perform other management functions.

In some embodiments, the fingerprint sensor 203 is coupled to a touch sensor 205 (FIG. 2) that is configured to sense when a user touches the fingerprint sensor 203. Normally, the fingerprint sensor 203 is transitioned to a sleep state in which the fingerprint sensor 203 draws little or no power. When the touch sensor 205 senses touch, the fingerprint sensor 203 is transitioned to an awake state in which components of the fingerprint sensor 203 are powered for at least a certain amount time so that the fingerprint sensor 203 is able to capture fingerprints. Thus, the fingerprint sensor 203 draws more power in the awake state than the sleep state.

Various types of touch sensors 205 may be used to detect a touch of the user. In some embodiments, the touch sensor 205 is capacitive and senses a change in capacitance caused by a presence of the user's finger. In some embodiments, the touch sensor 205 can be implemented as a single channel capacitive touch sensor, although other configurations of touch sensor 205 are possible, such as a multi-channel capacitive touch sensor, a resistive touch sensor, a piezoelectric touch sensor, and/or a triboelectric touch sensor. Use of a single channel capacitive touch sensor provides some advantages, for example having a reduced form factor and reduced complexity as compared to a multi-channel capacitive touch sensor. In at least one embodiment, the touch sensor 205 is electrically coupled to a bezel 208 (FIG. 3) of the fingerprint sensor 203 that is positioned around or near the transparent surface 207 through which an image of the fingerprint is captured. That is, as the user positions his or her fingertip onto the surface 207 for capture of a fingerprint image, the fingertip comes sufficiently close to or touches the bezel 208, thereby changing the capacitance sensed by the sensor 205. In this regard, the bezel 208 is composed of conductive material and provides a touch electrode for use in sensing the user's finger. The touch sensor 205 is configured to detect the capacitance change and to notify the CMD control circuitry 200 (e.g., the processor 202) when the change in capacitance is sufficiently high to indicate a presence of the user's finger (e.g., a touch of the fingerprint sensor 203). In response, the CMD control circuitry 200 (e.g., the processor 202) is configured to awaken the fingerprint sensor 203 so that it is capable of capturing a fingerprint image of the user's fingertip. Thus, the fingerprint sensor 203 should be maintained in the sleep state for extended periods of time, thereby conserving the CMD's power resources, but when the user places his or her finger on or near the fingerprint sensor 203 for image capture, the fingerprint sensor 203 is automatically transitioned from the sleep state to the awake state without the user having to provide a separate input for turning on the CMD 103 or the fingerprint sensor 203, such as moving a power switch or providing some other type of input.

In the sleep state, a number of components of CMD 103 may be turned off or be transitioned to a "low power" mode, in which the components draw very little power (e.g., less than or equal to approximately 1 Watt). For example, in the sleep state, processor 202 may be transitioned to a low power mode. In some embodiments, the sleep state may be configured to allow a user to use touch sensor 205 to transition CMD 103 to an awake state. In this regard, in addition to transitioning the processor 202 to low power mode, antenna 222, communication circuitry 225 (including NFC transceiver 227), input device 204 (e.g., fingerprint sensor 203), and/or rectification circuitry 233 may be transitioned to a low power mode, or be turned off entirely in the sleep state. In some embodiments, the sleep state may be configured to allow a user to use an NFC device 241 to transition CMD 103 to an awake state. In this regard, in addition to transitioning the processor 202 to low power mode, input device 204 (e.g., fingerprint sensor 203) and/or touch sensor 205 may be transitioned to a low power mode, or be turned off entirely in the sleep state. It should be noted that in various embodiments, touch sensor 205, antenna 222, and rectification circuitry 233 may remain powered in the sleep state to allow the user to transition CMD 103 from the sleep state to the awake state using either NFC device 241 or touch sensor 205.

In an embodiment that uses the bezel 208 as a touch electrode, the bezel 208 is electrically coupled to the touch sensor 205 and may not be grounded when detecting for capacitive changes. In such embodiments, the bezel 208 may be protected from electrostatic discharge (ESD) via various types of ESD-protective circuits.

In this regard, an ESD-protective circuit may use one or more diodes (e.g., TVS diodes) that provide an electrical path to ground only during an ESD strike. During normal operation, the one or more diodes do not act as transient voltage suppressors (e.g., the one or more diodes do not conduct), and therefore facilitate normal operation of the fingerprint sensor 203 and touch sensor 205. However, during an ESD strike, a voltage spike occurs, which triggers the one or more diodes to switch from a non-conductive state to a conductive state, thereby diverting the voltage spike through the one or more diodes and away from the touch sensor 205 and fingerprint sensor 203 and into a ground. Diodes with low capacitance may be used for the ESD-protective circuit in order to reduce the impact of such diodes on the performance of the capacitive touch sensor 205. For example, using a diode with a relatively higher capacitance may cause the capacitive touch sensor 205 to not be able to detect a change in capacitance in response to a user touching fingerprint sensor 203. In other words, touch sensor 205 is constantly monitoring the change in capacitance over time, and if the ESD-protective circuit contributed more than a threshold value of capacitance to the touch sensor 205, the touch sensor 205 may be unable to detect the change in capacitance that is attributable to a user of the device touching touch sensor 205. According to some embodiments, the ESD-protective circuit may comprise less than approximately 30 Pico farads, inclusive of parasitic capacitance of the bezel, circuit flexboard, and neighboring copper components of the ESD-protective circuit. In one embodiment, each diode of the ESD-protective circuit may comprise approximately one to five Pico farads of capacitance. Additionally, in order to increase the effective use of the diodes for ESD protection, the diodes may be placed close to the bezel 208 in an effort to reduce parasitics that would reduce the effectiveness of the diodes as transient voltage suppression diodes (by avoiding longer circuit trace lengths that contribute to undesirable parasitic inductance attributable to a larger loop area of the circuit). In one embodiment, the diodes may be placed within approximately 5 mm or less of each other. In another embodiment, the diodes may be placed within approximately 2.5 mm or less of each other.

Placing the diodes in the interior region of the bezel 208 may interfere at least to an extent with the image of the fingerprint. In some fingerprint sensor designs, the exterior of the bezel 208 may also be a challenging location for the diodes of the ESD-protective circuit as this area sometimes sits flush against the housing of the fingerprint sensor, creating a seal for protecting against liquid ingress. The bottom of the fingerprint bezel 208 in some fingerprint sensor designs has a stiffener that is to be supported by an internal structure, making it problematic to use the bezel bottom as a location for the diodes of the ESD-protective circuit. In some embodiments of the present disclosure, one or more channels are formed in the bezel 208, and one or more diodes of the ESD-protective circuit are situated in such channel. Such location of the diodes allows for reduced parasites and excellent ESD protection.

Figure 4A:
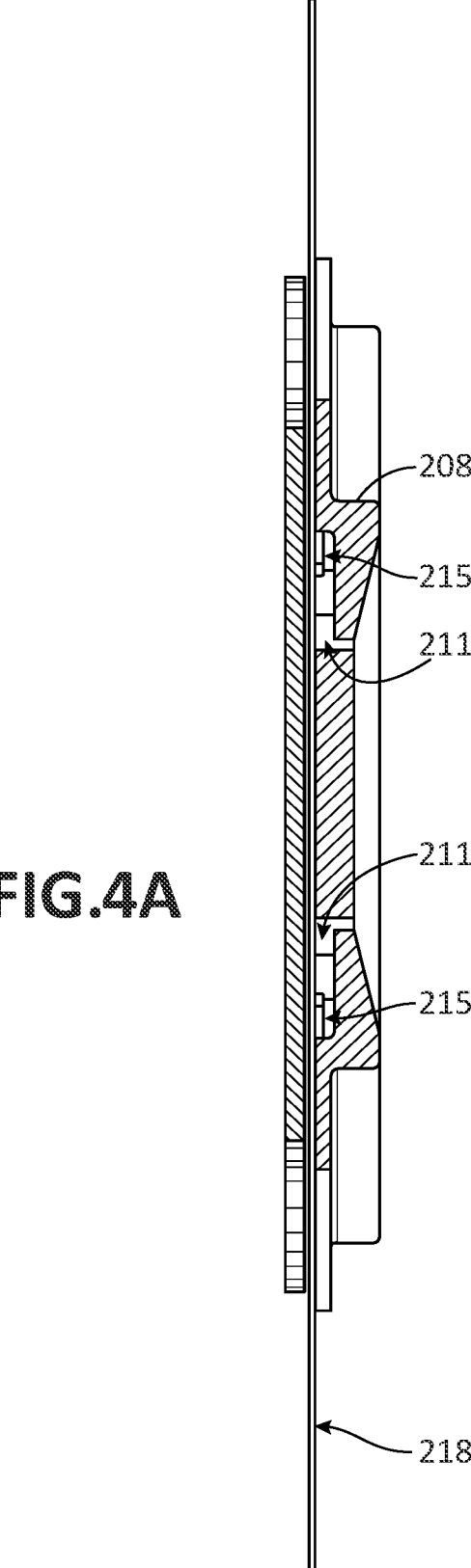
FIG. 4A is a cross-sectional view of an input device of a CMD, such as is depicted by FIG. 3.

FIG. 3 depicts an exemplary embodiment of a bezel 208, and FIG. 4A shows a cross-sectional view of an exemplary embodiment of a bezel 208 depicted by FIG. 3. As shown by FIG. 4A, the bezel 208 has a channel 211 formed in the bottom surface 218B of the bezel 208, and one or more diodes 215 (e.g., TVS diodes) are located in the channel 211. As shown by FIGS. 4A and 5, each diode 215 may be electrically coupled to the bezel 208 and to ground 220. In this regard, in the embodiment depicted by FIG. 4 and FIGS. 5A-5B, the bezel 208 may be mounted on an upper surface 218A of a substrate 218 (e.g., a printed circuit board), and each diode 215 may be mounted on the upper surface 218A of the substrate 218 within the channel 211. Further, each diode 215 may contact the bezel 208 to form a conductive connection to the bezel 208. In addition, each diode 215 may also be electrically coupled to a ground plane 220 that is mounted on the lower surface of the substrate 218 using a conductive via 219 that passes through the substrate 218, thereby connecting upper surface 218A with bottom surface 218B. When an ESD strike on the bezel 208 occurs, energy from the strike is sufficient to turn on the diodes 215 so that such energy passes through the diodes 215 to ground 220. However, at other times, such as when no ESD strikes are occurring, the diodes 215 electrically isolate the bezel 208 from ground 220 so that the bezel 208 may be used as a touch electrode for the capacitive touch sensor 205, as described above. According to some embodiments, the diodes 215 are selected to have a reverse working voltage of approximately 5.5 V (e.g., where the diodes begin to conduct), a breakdown voltage of approximately 7 V (e.g., where the diodes are fully conductive), and can provide protection against air-gapped ESD strikes up to 25 kV and up to 8 kV for contact ESD strikes. In some examples, bottom surface 218B of substrate 218 can include isolation material 224 to minimize parasitic capacitance. Isolation material 224 can be constructed of any suitable non-conductive material, for example but not limited to ceramics, fiberglass, polytetrafluoroethylene (PTFE), and/or fiberglass-epoxy laminates. In a specific embodiment best illustrated in FIGS. 5A-5B, four diodes 215 can be spaced apart by approximately 90 degrees along the bezel 208.

Figure 4B:
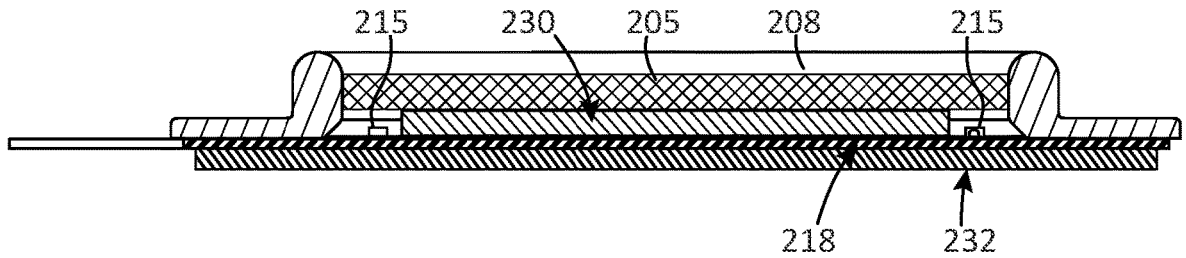
FIG. 4B is a cross-sectional view of an alternate embodiment of an input device of a CMD, such as is depicted by FIG. 3.
Figure 4C:
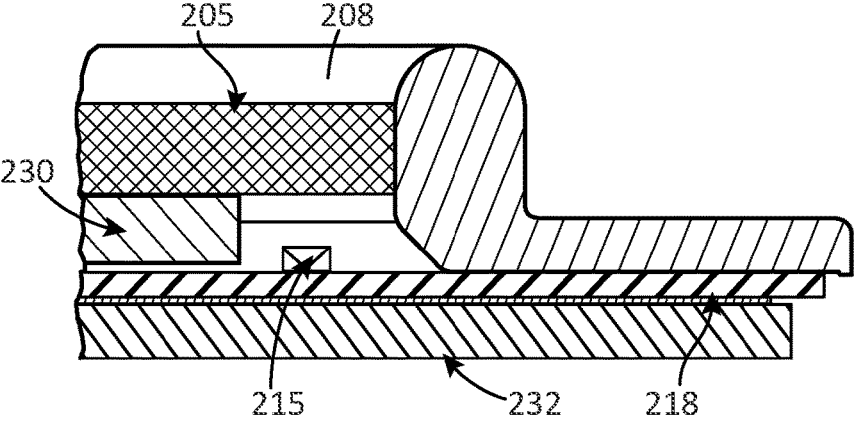
FIG. 4C is a cross-sectional view of the alternate embodiment of an input device of a CMD, such as is depicted by FIG. 4B
Figure 5A:
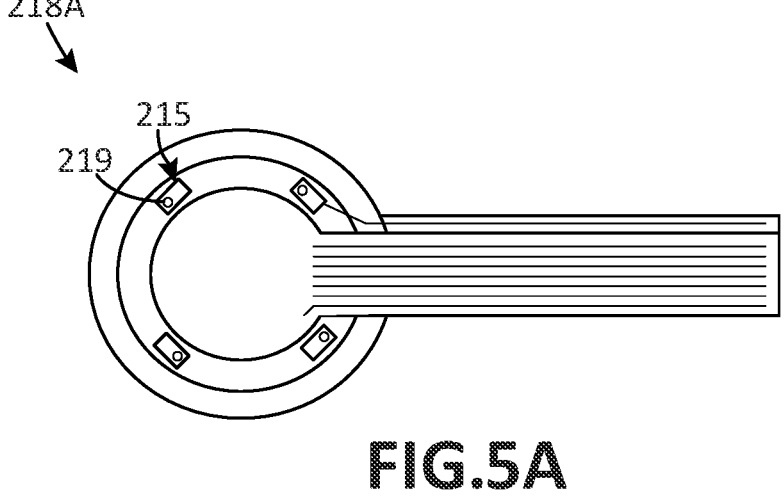
FIG. 5A depicts the top layer of an ESD-protective circuit that may be used with the input device depicted by FIGS. 3 and 4.
Figure 5B:
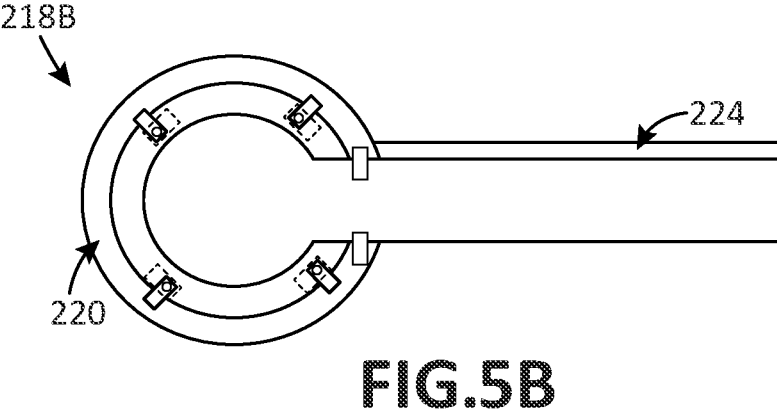
FIG. 5B depicts the bottom layer of an ESD-protective circuit that may be used with the input device depicted by FIGS. 3 and 4.

FIGS. 4B-4C depict another embodiment of the bezel 208 with an alternative placement of the one or more diodes 215 (e.g., TVS diodes). In the embodiment shown in FIGS. 4B-4C, the touch sensor 205 is placed above an interposer printed circuit board 230, which functions to space the touch sensor 205 from the substrate 218, which, according to some embodiments, allows touch sensor 205 to be mounted approximately flush with the bezel 208. Notably, the interposer printed circuit board 230 has a smaller relative width with respect to the touch sensor 205. One or more diodes 215 (e.g., TVS diodes) can be placed on either side of the interposer printed circuit board 230. The interposer printed circuit board 230 can be positioned in contact with and above the substrate 218. As shown in FIGS. 4B-4C, the one or more diodes 215 can be in electrical contact with touch sensor 205 and ground 220, thereby protecting touch sensor 205 from ESD strikes by diverting the ESD from touch sensor 205 and into the ground 220. In some embodiments, substrate 218 can comprise a printed circuit board similar to the design of interposer printed circuit board 230. According to some embodiments, a stiffener 232 may also be provided in order to provide additional structural support to the substrate 218, interposer printed circuit board 230, touch sensor 205, and bezel 208.

Notably, components of the CMD control circuitry 200, such as the processor 200, and other components of the CMD 103, such as the communication circuitry 225, may be transitioned to a sleep state and then awoken in response to a touching of the fingerprint sensor 203. That is, when the CMD control circuitry 200 receives a signal from the touch sensor 205 indicating that the touch sensor 205 has sensed the user's finger, the CMD control circuitry 200 may be configured to activate (e.g., awaken) the processor 202 and at least portions of the communication circuitry 225, such as the NFC transceiver 227.

As an alternative, various components of the CMD 103, such as the processor 202 and portions (e.g., NFC transceiver 227) of the communication circuitry 225 may be activated (e.g., awoken) using other techniques. In some embodiments, such components may be activated based on rectification circuitry 233 that is electrically coupled to the antenna 222 and the CMD control circuitry 200, as shown by FIG. 2. When an external NFC device 241 (FIG. 2), such as the mobile communication device 105 (FIG. 1), is moved within communication range for the antenna 222, the rectification circuitry 233 is configured to sense the NFC signal wirelessly transmitted by the NFC device 241 and convert the NFC signal into a signal, referred to herein as "activation signal," that activates one or more components of the CMD control circuitry 200. As an example, the CMD control circuitry 200 can awaken processor 202 in response to the activation signal from the rectification circuitry 233. In some embodiments, the rectification circuitry 233 is configured to convert the NFC signal into a digital signal, but it is possible for the activation signal transmitted to the CMD control circuitry 200 to be analog in other embodiments. In some examples, the rectification circuitry 233 may be implemented as a full bridge rectifier, although other configurations of rectification circuitry 233 are possible. Advantages of a full bridge rectifier include a higher power efficiency than other types of rectifiers, such as half-wave rectifiers. A full bridge rectifier outputs a smoother output than other types of rectifiers, such as half-wave rectifiers. Also, a full bridge rectifier can process both positive and negative half cycles of an input AC signal, whereas half-wave rectifiers are configured to process only half of the AC signal, and block the other. The full bridge rectifier is also more effective at rejecting noise and can boost performance for NFC signals. The full bridge rectifier also has the benefit of providing an equal loading across the two differential legs of the NFC antenna 222. Finally, the use of a full bridge rectifier creates an additional "center path" to ground that is not otherwise available to the CMD 103 and prevents undesirable current from traveling through components of the communication circuitry (e.g., the NFC transceiver 227). Upon awakening, the processor 202 (or other portion of the CMD control circuitry 200) may be configured to transmit a signal to the communication circuitry 225 for activating (e.g., awakening) one or more components of the communication circuitry 225, such as the NFC transceiver 227. It should be understood that CMD 103 can be awoken in response to a touching of the fingerprint sensor 203, receiving wireless signal via rectification circuitry 233, or combinations thereof. For example, if the fingerprint sensor 203 malfunctions, the CMD 103 can still be activated via a wireless signal received by rectification circuitry 233, and conversely, if rectification circuitry 233 malfunctions, CMD 103 can still be activated via a touching of the fingerprint sensor 203.

Thus, once the NFC device 241 is moved sufficiently close (e.g., when antenna 222 of the CMD 103 is close enough to the NFC device 241 to communicate with NFC device 241) to the CMD 103 for communication between the CMD 103 and the NFC device 241, components of the CMD 103, such as the processor 202 and portions of the communication circuitry 225, are automatically awoken thereby enabling the NFC device 241 to successfully communicate with the CMD 103. As used herein, "sufficiently close" means a distance for which NFC communication is enabled between NFC device 241 and CMD 103. In some embodiments, the distance can be less than approximately 10 cm. In another embodiment, the distance can be less than approximately 5 cm. In yet another embodiment, the distance can be less than approximately 1 cm. In any case, once communication with the NFC device 241 is enabled, various management operations, such as authentication of the user or initiation or processing of a transaction for transferring cryptocurrency stored by the CMD 103, may be performed via communication between the CMD 103 and the NFC device 241 or other device. As an example, the processor 202 may receive authentication credentials, such as a username and password, from the NFC device 241 for authenticating the user of the NFC device 241. In some embodiments, the authentication credentials may be transmitted to the CMD 103 using the NFC protocol. For example, antenna 222 of CMD 103 may be configured to receive the authentication credentials and transmit the authentication credentials to the NFC transceiver 227 of communication circuitry 225. The NFC transceiver 227 may transmit the authentication credentials to processor 202 of CMD control circuitry 200. Processor 202 may authenticate the user when the received authentication credentials match authentication credentials stored by CMD 103. If such authentication is successful, the CMD control circuitry 200 may allow the user to then perform other management functions as may be desired.

Figure 6:
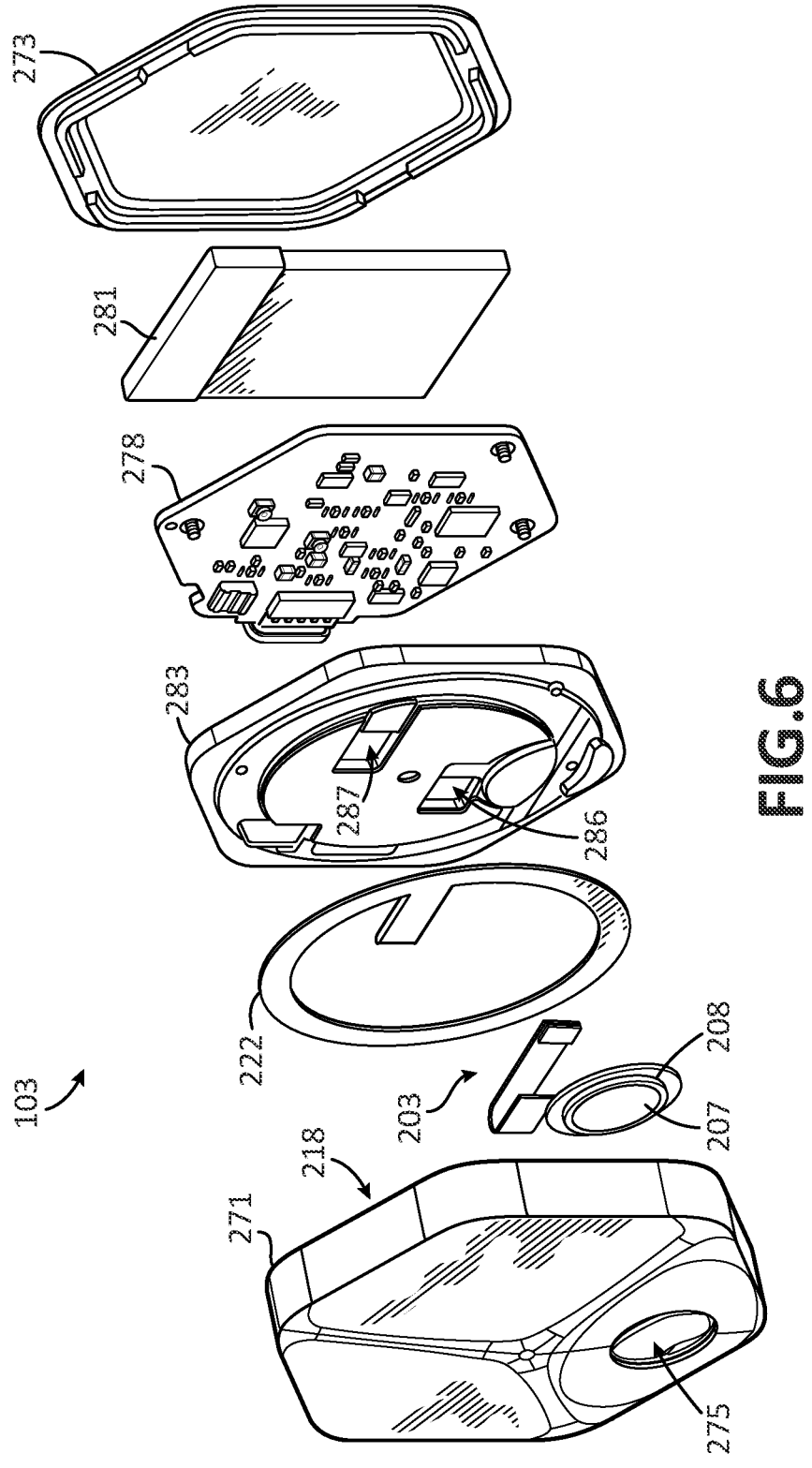
FIG. 6 is a diagram illustrating an exploded view for an exemplary embodiment of a CMD, such as is depicted by FIG. 2.

FIG. 6 shows an exploded view of an embodiment of the CMD 103. As shown by FIG. 6, the CMD 103 has a top enclosure 271 and a bottom cover 273 that form a housing for other components of the CMD 103. Notably, in some examples, the substrate 218 may be attached to the inner surface of enclosure 271 such that upper surface 218A is in contact with inner surface of enclosure 271. Further, the top enclosure 271 has a hole 275 for exposing the fingerprint sensor 203 shown by FIG. 3. In addition, an NFC flex circuit forms the antenna 222 that may be used to wirelessly communicate NFC signals. Various circuitry, such as the CMD control circuitry 200, communication circuitry 225, and rectification circuitry 233, may be mounted on a printed circuit board (PCB) 278, which is electrically coupled to a battery 281 positioned between the PCB 278 and the bottom cover 273. Further, the fingerprint sensor 203 and antenna 283 may be mounted on and electrically coupled to a chassis 283 that is between the top enclosure 271 and the PCB 278. Specifically, the fingerprint sensor 203 may be electrically coupled to the PCB 278 through a hole 286 in the chassis 283, and the antenna 22 may be electrically coupled to the PCB 278 through a hole 287 in the chassis 283. Other configurations of the CMD 103 are possible in other embodiments.

Figure 7:
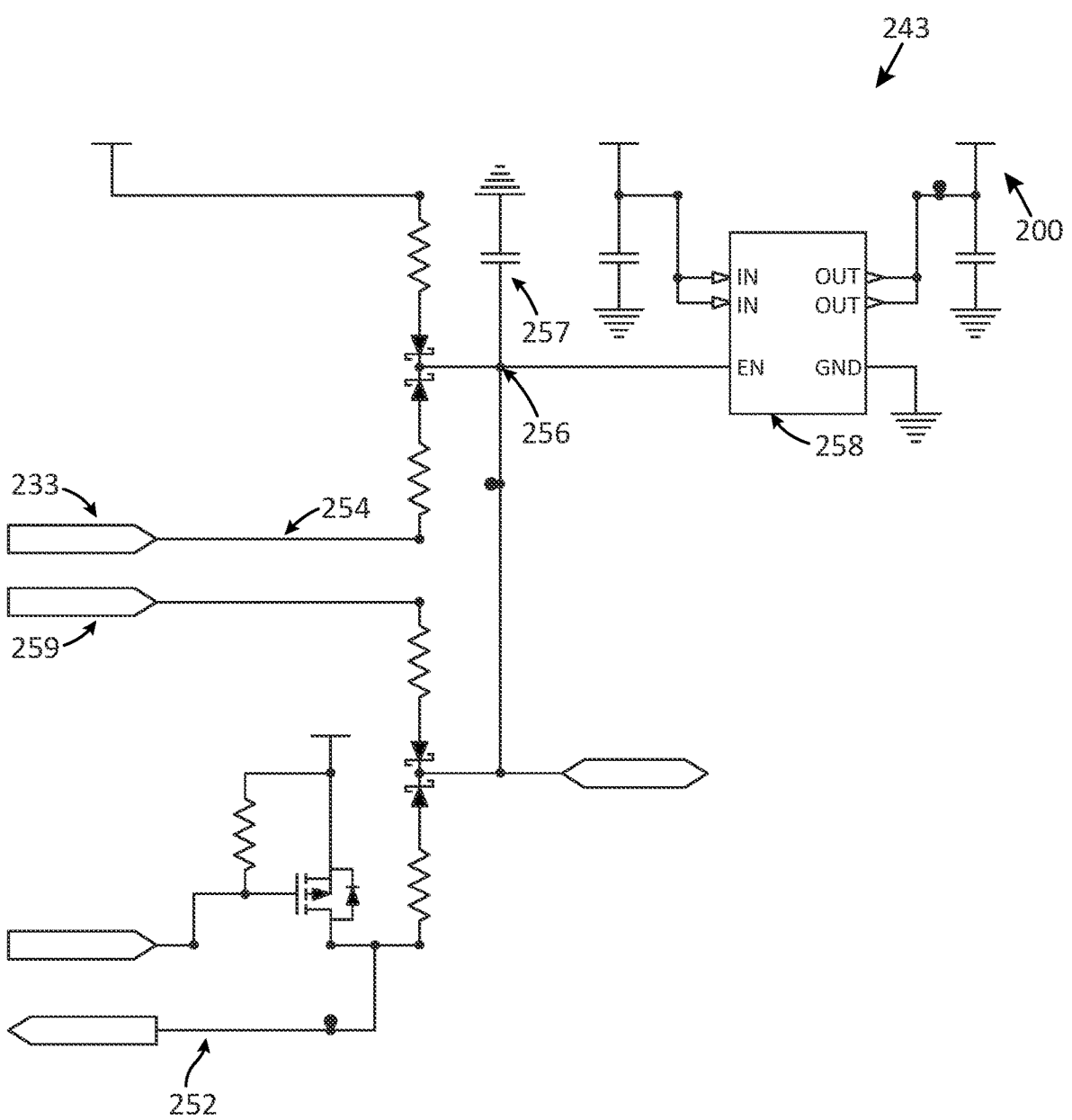
FIG. 7 depicts an exemplary embodiment of load switch circuitry for a CMD according to an exemplary embodiment of the present disclosure.

FIG. 7 shows an exemplary embodiment of load switch circuitry 243 for CMD 103. Load switch circuitry 243 is configured to pass an activation signal from one or both of rectification circuitry 233 and touch sensor 205, and therefore allow CMD control circuitry 200 to transition from a sleep state to an awake state. Although not shown in FIG. 7, it should be understood that in various embodiments, the CMD control circuitry 200 can receive an activation signal from a device that is connected to an "I/O" port of the CMD 103, such as a USB port of the CMD 103. Returning to FIG. 7, an activation signal can be passed from rectification circuitry 233 to NFC circuitry 254. Touch sensor circuitry 252 and NFC circuitry 254 are connected at a junction 256 such that an activation signal received from either NFC circuitry 254 and touch sensor circuitry 252 passes through load switch 258 to activate CMD circuitry 200. In some embodiments, junction 256 can be coupled to a capacitor 257 that may be used to filter the activation signal from NFC circuitry 254 to ensure that the power level of the activation signal does not drop below a predetermined threshold intermittently, to reduce the likelihood of an activation signal dropping too low to be detected by load switch 258. Although not specifically shown in FIG. 7, in some embodiments, load switch 258 can be optionally coupled to a diode 260 (e.g., a zener diode) that prevents the activation signal from NFC circuitry 254 from surpassing a predetermined threshold which can overload components of CMD control circuitry 200. When CMD control circuitry 200 receives the activation signal, CMD control circuitry 200 can cause the processor 202 to transition from the sleep state to the awake state. It should be noted that once processor 202 is transitioned from the sleep state to the awake state, the processor 202 may cause hold power circuitry 259 to be activated, which provides instruction to processor 202 to remain in the awake state until receiving a command to transition back to the sleep state. For example, firmware running on processor 202 can cause the hold power circuitry 259 to transition from a low power state to a high power state in response to the processor 202 transitioning to the awake state from the sleep state. The high power state of hold power circuitry 259 instructs processor 202 to remain in the awake state until hold power circuitry 259 returns to a low power state. Because activation signals are transient within CMD 103, hold power circuitry 259 provide a constant signal that instructs processor to remain in the awake state until CMD circuitry 200 receives a command instructing the CMD 103 to transition back to the sleep state. Hold power circuitry 259 can be understood to be a "power latch" that allows processor 202 to remain in the awake (high power state) after the cessation of an activation signal.

Figure 8:
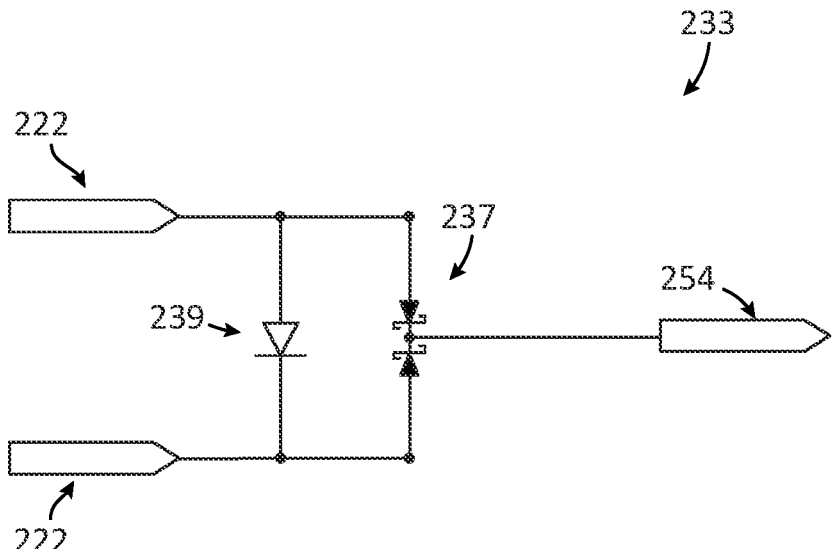
FIG. 8 depicts an exemplary embodiment of circuitry for a CMD, such as depicted by FIG. 2.

FIG. 8 shows an embodiment of a circuit that may be used to implement the rectification circuitry 233 shown by FIG. 2. As shown in FIG. 8, an NFC signal can be received by antenna 222 and rectified from an alternating current to a direct current by rectifier 237 to generate an activation signal. It should be understood that antenna 222 can be implemented as an NFC coil. In some examples, rectifier 237 can be implemented as one or more diodes. More specifically, rectifier 237 can be implemented as one or more Schottky diodes. The activation signal generated by rectification circuitry 233 can be passed to NFC circuitry 254, as was described with respect to FIG. 7. According to some embodiments, the rectification circuitry 233 can include a diode 239 that smooths and filters the NFC signal before it is passed to the rectifier 237.

Note that, in some embodiments, a user may activate the CMD 103 using either the fingerprint sensor 203 or the NFC device 241. For example, if the user wishes to activate the CMD 103 using the fingerprint sensor 203, the user may simply touch the fingerprint sensor 203 with his or her finger. Such touching changes the capacitance of the bevel 208, thereby causing the touch sensor 205 to transmit an activation signal to the CMD control circuitry 200 for awakening components of the CMD control circuitry 200, such as the processor 202. When awakened, the processor 202 may be configured to awaken one or more components of the communication circuitry 225, such as the NFC transceiver 227, for enabling the CMD 103 to communicate using the antenna 222. At this point, the user may use the NFC device 241 or other device to communicate with the CMD 103 via the antenna 222 to perform one or more management operations, such as initiating or processing a transaction to transfer cryptocurrency stored in the CMD 103.

Alternatively, if the user instead prefers to use the NFC device 241 to activate the CMD 103, the user may position the NFC device 241 sufficiently close to the antenna 222 such that the rectification circuitry 233 converts the NFC signal from the NFC device 241 into an activation signal that is transmitted to the CMD control circuitry 200. In response, components of the CMD control circuitry 200, such as the processor 202, and components of the communication circuitry 225, such as the NFC transceiver 227, may be awoken using the same techniques described above for the activation signal received from the touch sensor 205. In other embodiments, yet other ways of activating components of the CMD 103 are possible.

Because the rectification circuitry 233 uses energy from an NFC signal received from an external NFC device 241 in order to provide an activation signal for awakening components of the CMD 103, the rectification circuitry 233, over extended periods of time, may remain continuously ready to trigger activation of components of the CMD 103 without consuming electrical power from the CMD's battery. The touch sensor 205 similarly allows for continuous monitoring of the state of the fingerprint sensor 203 so that activation of components of the CMD 103 can be triggered at any time without requiring significant electrical power from the CMD's battery. Thus, the techniques described herein for activating the CMD 103 may be performed over extended periods of time without consuming very much power from the CMD's battery, thereby helping to extend the battery's useful life.

Figure 9:
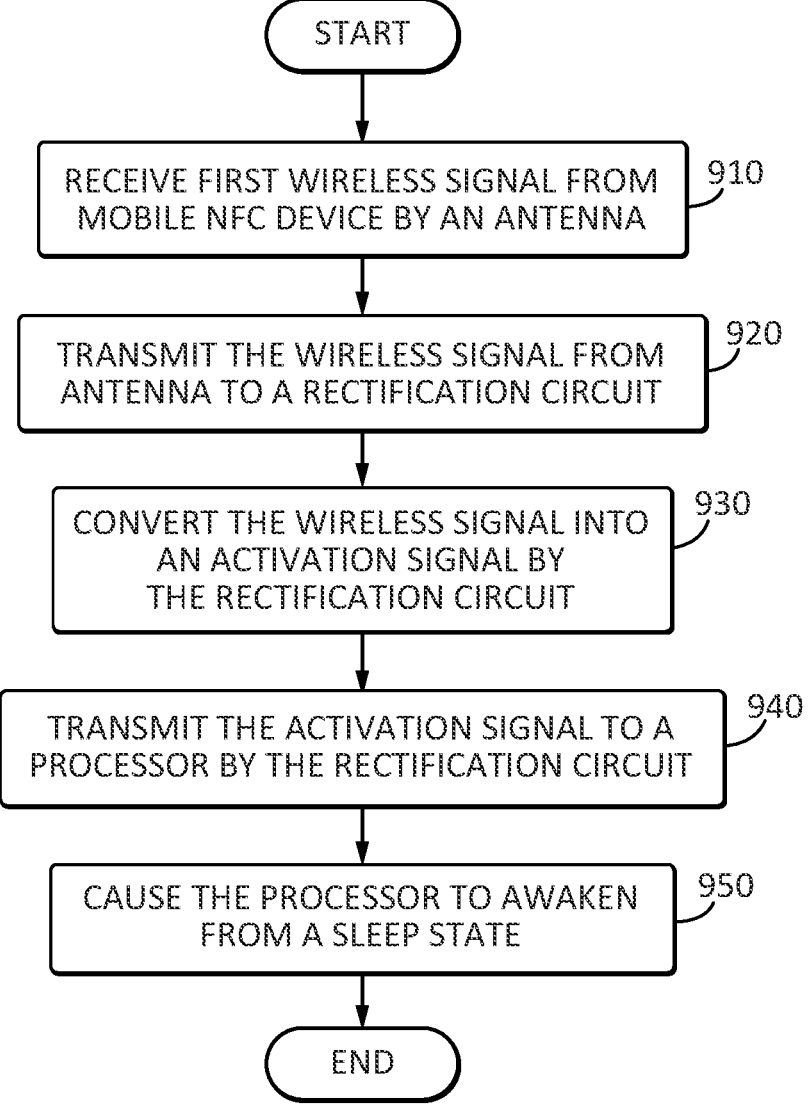
FIG. 9 is a flowchart of an exemplary method of using a wireless signal to awaken a CMD from a sleep state.

FIG. 9 is a flowchart of an exemplary method of using a wireless signal to awaken CMD 103 from a sleep state. In block 910, the method can include receiving a first wireless signal from a mobile device (e.g., mobile communication device 105) via antenna 222 of CMD 103. In block 920, the method can include transmitting the wireless signal from antenna 222 to rectification circuit 233. In block 930, the method can include the rectification circuit 233 the wireless signal into an activation signal. In block 940, the method can include transmitting the activation signal by the rectification circuit 233 to processor 202. In block 950, the method can include causing the processor 202 to awaken from a sleep state.

In some embodiments, the method can include processor 202 causing communication circuitry 225 (e.g., NFC transceiver 227) that is coupled between the at least one processor 202 and the antenna 222 to awaken from a sleep state. The CMD 103 can receive a second wireless signal from the mobile device via antenna 222. The second wireless signal can be transmitted to the communication circuitry 225 and transmitting the second wireless signal from the communication circuitry 225 to the processor 202.

In some examples, the second wireless signal can include authentication data and in response to receiving authentication data, the processor 202 can authenticate a user of the mobile device.

In some examples, the second wireless signal can be an NFC signal the communication circuitry 225 can include NFC transceiver 227.

In some examples, the processor 202 can be configured to store at least one private key for use in generating an authenticating signature for a multi-signature address of a cryptocurrency network. In response to authenticating the user, the processor 202 can cause the at least one private key to be transmitted to the mobile (NFC) device (e.g. mobile communication device 105).

In some examples, the first wireless signal can be an NFC signal.

Figure 10:
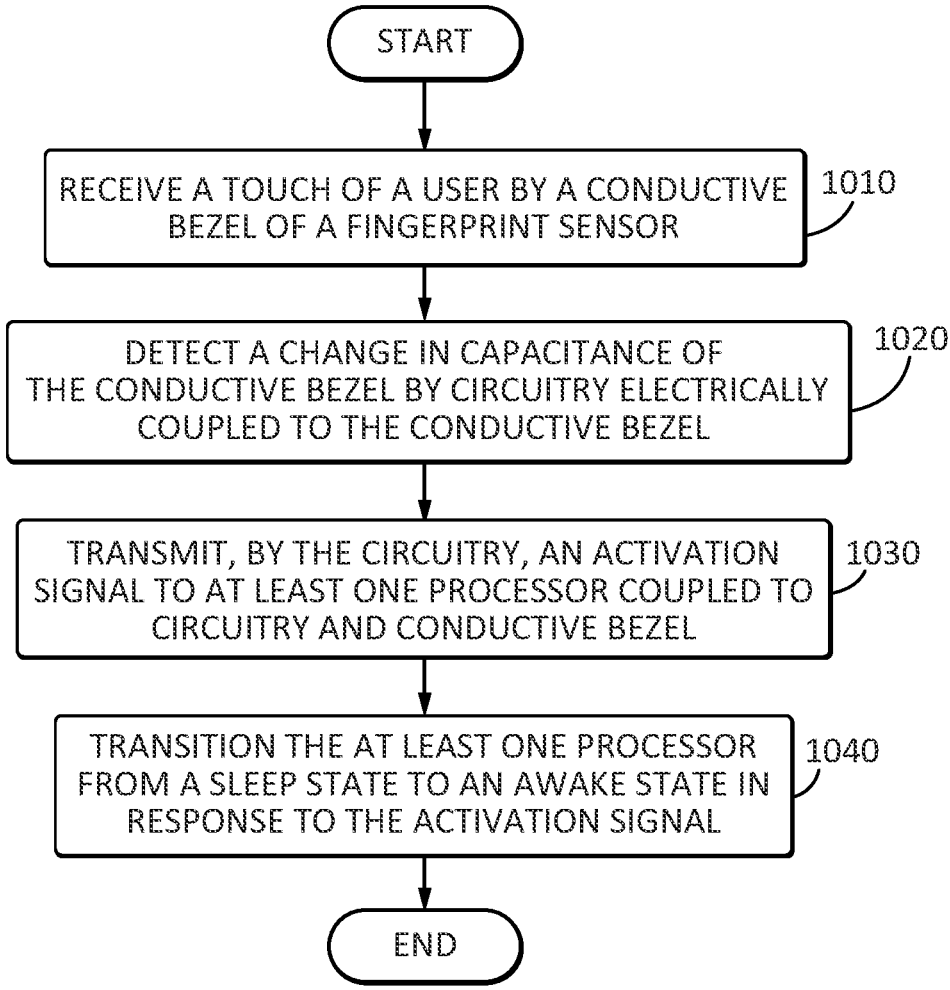
FIG. 10 is a flowchart of an exemplary method of using a fingerprint sensor to awaken a CMD from a sleep state.

FIG. 10 is a flowchart of an exemplary method of using a fingerprint sensor to awaken CMD 103 from a sleep state. In block 1010, the method can include the CMD 103 receiving a touch of a user. For example, the user may touch conductive bezel 208 of fingerprint sensor 203. In block 1020, the method can include detecting a change in capacitance of conductive bezel 208 by circuitry (e.g., CMD control circuitry 200) that is electrically coupled both to the conductive bezel 208 and to the at least one processor (e.g., processor 202). In block 1030, the method can include transmitting, by the circuitry (e.g., CMD control circuitry 200), an activation signal to processor 202. In block 1040, the method can include transitioning processor 202 from a sleep state to an awake state in response to the activation signal received from CMD control circuitry 200. In some examples, the method can include receiving, by conductive bezel 208 of fingerprint sensor 203, an electrostatic discharge, and dissipating the electrostatic discharge through one or more diodes 215 to a ground plane 220.

In some examples, the one or more diodes 215 can be electrically coupled to the conductive bezel and to the ground plane 220. The one or more diodes 215 can be configured to allow the CMD control circuitry 200 to detect the change in capacitance of conductive bezel 208 in the absence of an electrostatic discharge.

In some examples, the at least one processor (e.g., processor 202) can be configured to store at least private key for use in generating an authenticating signature for a multi-signature address of a cryptocurrency network and perform operations for managing cryptocurrency associated with the multi-signature address, including authorization of at least one transaction for transferring the cryptocurrency.

In some examples, the method can include, in response to processor 202 transitioning to the awake state, processor 202 causing communication circuitry 225 to transition to an awake state from a sleep state. Processor 202 can further cause the communication circuitry 225 to transmit the at least one private key to a mobile device (e.g., mobile communication device 105) via antenna 222.

In some examples, the method can include, in response to processor 202 transitioning to the awake state, detecting, via touch sensor 205 of fingerprint sensor 203, a fingerprint of a user and authenticating the user based on the detected fingerprint.

As will be apparent from the above discussion, any of the methods discussed herein may be implemented by a computer. In other words, a data processing apparatus, device or system can comprise means for carrying out the steps of any of the methods disclosed herein. A computer program can comprise instructions which, when the program is executed by a computer, cause the computer to carry out the steps of any of the methods disclosed herein. Finally, a computer-readable medium can comprise instructions which, when executed by a computer, cause the computer to carry out the steps of any of the methods disclosed herein.

The disclosed embodiments can be implemented according to at least the following clauses:

Clause 1: A cryptocurrency management device, comprising: an antenna for receiving a wireless signal from a mobile near field communication (NFC) device; at least one processor configured to store at least one private key for use in generating an authenticating signature for a multi-signature address of a cryptocurrency network and perform operations for managing cryptocurrency associated with the multi-signature address, including authorization of at least one transaction for transferring the cryptocurrency; and a rectification circuit electrically coupled to the antenna and the at least one processor, the rectification circuit configured to receive energy of the wireless signal from the antenna and convert the received energy into an activation signal for activating the at least one processor, the rectification circuit configured to transmit the activation signal to the at least one processor thereby causing the at least one processor to awaken from a sleep state.

Clause 2: The cryptocurrency management device of clause 1, wherein the received signal is a near field communication (NFC) signal wirelessly transmitted to the antenna from an NFC device.

Clause 3: The cryptocurrency management device of clause 2, further comprising communication circuitry coupled between the at least one processor and the antenna, wherein the at least one processor, upon awakening from the sleep state, is configured to cause at least one component of the communication circuitry to awaken from a sleep state, thereby enabling communication between the cryptocurrency management device and the NFC device.

Clause 4: The cryptocurrency management device of clause 3, wherein the at least one component of the communication circuitry comprises an NFC transceiver.

Clause 5: The cryptocurrency management device of clause 4, wherein the NFC transceiver is implemented as an integrated circuit.

Clause 6: A device, comprising: an antenna for receiving a wireless signal from a mobile device; at least one processor; and a rectification circuit electrically coupled to the antenna and the at least one processor, the rectification circuit configured to receive energy of the wireless signal from the antenna and convert the received energy into an activation signal for activating the at least one processor, the rectification circuit configured to transmit the activation signal to the at least one processor thereby causing the at least one processor to awaken from a sleep state.

Clause 7: The device of clause 6, wherein the received signal is a Bluetooth signal wirelessly transmitted to the antenna from the mobile device.

Clause 8: The device of clause 6, further comprising communication circuitry coupled between the at least one processor and the antenna, wherein the at least one processor, upon awakening from the sleep state, is configured to cause at least one component of the communication circuitry to awaken from a sleep state, thereby enabling communication between the device and the mobile device.

Clause 9: The device of clause 8, wherein the received signal is an NFC signal wirelessly transmitted to the antenna from the mobile device.

Clause 10: The device of clause 9, wherein the at least one component of the communication circuitry comprises an NFC transceiver.

Clause 11: The device of clause 6, wherein the rectification circuit comprises a full bridge rectifier.

Clause 12: The device of clause 6, wherein the processor is configured to store at least one private key for use in generating an authenticating signature for a multi-signature address of a cryptocurrency network and perform operations for managing cryptocurrency associated with the multi-signature address, including authorization of at least one transaction for transferring the cryptocurrency.

Clause 13: The device of clause 6, wherein the activation signal is a digital signal.

Clause 14: The device of clause 10, wherein: the antenna is configured to receive an NFC signal from the mobile device, the NFC signal comprising authentication credentials; upon awakening from the sleep state, the NFC transceiver is configured to receive the NFC signal from the antenna; the NFC transceiver transmits the NFC signal to the processor; and the processor authenticates a user of the mobile device based on the received authentication credentials.

Clause 15: A method of waking a cryptocurrency management device, comprising: receiving a first wireless signal from a mobile near field communication (NFC) device by an antenna of the cryptocurrency management device; transmitting the wireless signal from the antenna to a rectification circuit electrically coupled to the antenna; converting, by the rectification circuit, the wireless signal into an activation signal; transmitting, by the rectification circuit, the activation signal to a processor electrically coupled to the antenna and the rectification circuit; and causing the processor to awaken from a sleep state responsive to the processor receiving activation signal.

Clause 16: The method of clause 15, further comprising: the processor causing communication circuitry coupled between the at least one processor and the antenna to awaken from a sleep state; receiving a second wireless signal from the NFC device by the antenna; receiving, by the communication circuitry, the second wireless signal from the antenna; and transmitting, by the communication circuitry, the second wireless signal to the processor.

Clause 17: The method of clause 16, wherein the second wireless signal comprises authentication data and responsive to receiving the authentication data, the processor authenticates a user of the NFC device.

Clause 18: The method of any of clauses 16 or 17, wherein the second wireless signal comprises an NFC signal and the communication circuitry comprises an NFC transceiver.

Clause 19: The method of any of clause 15-18, wherein the processor is configured to store at least one private key for use in generating an authenticating signature for a multi-signature address of a cryptocurrency network and in response to authenticating the user the processor causes the at least one private key to be transmitted to the NFC device.

Clause 20: The method of any of clauses 15-19, wherein the first wireless signal comprises an NFC signal.

Clause 21. A computer program comprising instructions which, when the program is executed by a computer, cause the computer to carry out the method of any of clauses 15-20.

Clause 22. A computer-readable medium comprising instructions which, when executed by a computer, cause the computer to carry out the method of any of clauses 15-20.

Clause 23: A cryptocurrency management device, comprising: a fingerprint sensor having a transparent surface through which images of fingerprints are captured by the fingerprint sensor, wherein the fingerprint sensor has a conductive bezel positioned around the transparent surface; at least one processor configured to store at least one private key for use in generating an authenticating signature for a multi-signature address of a cryptocurrency network and perform operations for managing cryptocurrency associated with the multi-signature address, including authorization of at least one transaction for transferring the cryptocurrency, the at least one processor configured to authenticate a user based on at least one of the images of fingerprints captured by the fingerprint sensor; and circuitry electrically coupled to the conductive bezel and the at least one processor, the circuitry configured to detect a change in capacitance of the conductive bezel indicative of a touch by a user, the circuitry further configured to transmit an activation signal for activating the at least one processor in response to detection of the change in capacitance, wherein the at least one processor is configured to transition from a sleep state to an awake state in response to the activation signal.

Clause 24: The cryptocurrency management device of clause 23, further comprising: a ground plane; and one or more diodes electrically coupled to the conductive bezel and the ground plane, wherein the one or more diodes are configured to provide an electrical path between the ground plane and the conductive bezel in response to an electrostatic discharge, thereby grounding the conductive bezel.

Clause 25: The cryptocurrency management device of clause 24, wherein the one or more diodes comprise TVS diodes.

Clause 26: The cryptocurrency management device of either of clauses 24 or 25, wherein the one or more diodes are configured allow the circuitry electrically coupled to the conductive bezel to detect the change in capacitance of the conductive bezel in the absence of an electrostatic discharge.

Clause 27: The cryptocurrency management device of any preceding clause, further comprising: an antenna for receiving a wireless signal from a mobile device; and communication circuitry coupled between the at least one processor and the antenna, wherein the at least at least one processor, upon transitioning to the awake state, is configured to cause at least one component of the communication circuitry to transition to an awake state from the sleep state, thereby enabling communication between the cryptocurrency management device and the mobile device.

Clause 28: A cryptocurrency management device, comprising: a fingerprint sensor having a transparent surface through which images of fingerprints are captured by the fingerprint sensor, wherein the fingerprint sensor has a conductive bezel positioned around the transparent surface; at least one processor least one processor configured to authenticate a user based on at least one of the images of fingerprints captured by the fingerprint sensor; and circuitry electrically coupled to the conductive bezel and the at least one processor, the circuitry configured to detect a change in capacitance of the conductive bezel indicative of a touch by a user, the circuitry further configured to transmit an activation signal for activating the at least one processor in response to detection of the change in capacitance, wherein the at least one processor is configured to transition from a sleep state to an awake state in response to the activation signal.

Clause 29: The cryptocurrency management device of clause 28, further comprising: a ground plane; and one or more diodes electrically coupled to the conductive bezel and the ground plane, wherein the one or more diodes are configured to provide an electrical path between the ground plane and the conductive bezel in response to an electrostatic discharge, thereby grounding the conductive bezel.

Clause 30: The cryptocurrency management device of clause 29, wherein the one or more diodes comprise TVS diodes.

Clause 31: The cryptocurrency management device of either of clauses 29 or 30, wherein the one or more diodes are configured allow the circuitry electrically coupled to the conductive bezel to detect the change in capacitance of the conductive bezel in the absence of an electrostatic discharge.

Clause 32: The cryptocurrency management device of any of clauses 28 to 31, further comprising: an antenna for receiving a wireless signal from a mobile device; and communication circuitry coupled between the at least one processor and the antenna, wherein the at least at least one processor, upon transitioning to the awake state, is configured to cause at least one component of the communication circuitry to transition to an awake state from a sleep state, thereby enabling communication between the cryptocurrency management device and the mobile device.

Clause 33: The cryptocurrency management device of any of clauses 28 to 32, wherein the at least one processor is configured to store at least one private key for use in generating an authenticating signature for a multi-signature address of a cryptocurrency network and perform operations for managing cryptocurrency associated with the multi-signature address, including authorization of at least one transaction for transferring the cryptocurrency.

Clause 34: The cryptocurrency management device of clause 33, wherein in response to authenticating the user, the at least one processor is configured to cause the at least one private key to be transmitted to the mobile device.

Clause 35: The device of clause 29 or any of clauses 30 to 34 when dependent on clause 7, wherein the ground plane comprises isolation material that is configured to minimize parasitic capacitance of the one or more diodes.

Clause 36: The device of any of clauses 28 to 35, wherein the fingerprint sensor comprises a capacitive touch sensor configured to sense a change in capacitance caused by a presence of a user's finger.

Clause 37: A method of waking a cryptocurrency management device, comprising: receiving a touch of a user by a conductive bezel of a fingerprint sensor; detecting a change in capacitance of the conductive bezel by circuitry electrically coupled to the conductive bezel and at least one processor; transmitting, by the circuitry, an activation signal to the at least one processor in response to detecting the change in capacitance; and transitioning the at least one processor from a sleep state to an awake state in response to the activation signal.

Clause 38: The method of clause 37, further comprising: receiving, by the conductive bezel of the fingerprint sensor, an electrostatic discharge; and dissipating the electrostatic discharge through one or more diodes to a ground plane.

Clause 39: The method of either of clauses 37 or 38, wherein one or more diodes are electrically coupled to the conductive bezel and to a ground plane, wherein the one or more diodes are configured to allow the circuitry electrically coupled to the conductive bezel to detect the change in capacitance of the conductive bezel in the absence of an electrostatic discharge.

Clause 40: The method of any of clauses 37 to 39, wherein the at least one processor is configured store at least one private key for use in generating an authenticating signature for a multi-signature address of a cryptocurrency network and perform operations for managing cryptocurrency associated with the multi-signature address, including authorization of at least one transaction for transferring the cryptocurrency.

Clause 41: The method of any of clauses 37 to 40, wherein in response to the at least one processor transitioning to the awake state: the at least one processor causes communication circuitry that is coupled between the at least one processor and an antenna to transition to an awake state from a sleep state; and the at least one processor causes the communication circuitry to transmit the at least one private key to a mobile device via the antenna.

Clause 42: The method of any of clauses 37 to 41, further comprising: in response to the at least one processor transitioning to the awake state, detecting, via a touch sensor of the fingerprint sensor, a fingerprint of the user; and authenticating the user based on the detected fingerprint.

Clause 43. A computer program comprising instructions which, when the program is executed by a computer, cause the computer to carry out the method of any of clauses 37-42.

Clause 44. A computer-readable medium comprising instructions which, when executed by a computer, cause the computer to carry out the method of any of clauses 37-42.

Now, therefore, the following is claimed:

1. A cryptocurrency management device comprising:

an antenna for receiving a wireless signal from a mobile near field communication (NFC) device while the cryptocurrency management device is in a sleep state;

at least one processor configured to store at least one private key for use in generating an authenticating signature for a multi-signature address of a cryptocurrency network and perform operations for managing cryptocurrency associated with the multi-signature address, including authorization of at least one transaction for transferring the cryptocurrency;

a rectification circuit electrically coupled to the antenna and the at least one processor, wherein the rectification circuit is configured to modify at least one characteristic of the wireless signal from the antenna to convert the wireless signal into an activation signal for activating the at least one processor, wherein the rectification circuit is configured to transmit the activation signal to the at least one processor which causes the at least one processor to awaken the cryptocurrency management device from the sleep state to an awake state, wherein a power consumption by the at least one processor exceeds a threshold while the at least one processor is in the awake state, and wherein the power consumption by the at least one processor is less than the threshold by greater than zero while the at least one processor is in the sleep state; and a non-transitory computer-readable storage medium coupled to the at least one processor, wherein the at least one processor is configured to execute instructions stored in the non-transitory computer-readable storage medium while in the awake state and after receipt of the activation signal.

2. The cryptocurrency management device of claim 1, wherein the wireless signal is a near field communication (NFC) signal wirelessly transmitted to the antenna from an NFC device.

3. The cryptocurrency management device of claim 2, further comprising:

communication circuitry coupled between the at least one processor and the antenna, wherein the at least one processor, in response to awakening into the awake state, is configured to cause at least one component of the communication circuitry to awaken from the sleep state to the awake state, wherein the communication circuitry conveys at least one communication between the cryptocurrency management device and the NFC device while the at least one component of the communication circuitry is in the awake state.

4. The cryptocurrency management device of claim 3, wherein the at least one component of the communication circuitry includes an NFC transceiver.

5. The cryptocurrency management device of claim 4, wherein the NFC transceiver is implemented as an integrated circuit.

6. A cryptocurrency management device comprising:

an antenna for receiving a wireless signal from a mobile device while the cryptocurrency management device is in a sleep state;

at least one processor;

a rectification circuit electrically coupled to the antenna and the at least one processor, wherein the rectification circuit is configured to receive energy of the wireless signal from the antenna and convert the energy into an activation signal for activating the at least one processor, wherein the rectification circuit is configured to transmit the activation signal to the at least one processor which causes the at least one processor to awaken the cryptocurrency management device from the sleep state to an awake state, and wherein a power consumption by the at least one processor exceeds a threshold while the at least one processor is in the awake state, and wherein the power consumption by the at least one processor is less than the threshold by greater than zero while the at least one processor is in the sleep state; and a non-transitory computer-readable storage medium coupled to the at least one processor that is configured to store an indication of receipt of the activation signal.

7. The cryptocurrency management device of claim 6, wherein the wireless signal is a Bluetooth signal wirelessly transmitted to the antenna from the mobile device.

8. The cryptocurrency management device of claim 6, further comprising:

communication circuitry coupled between the at least one processor and the antenna, wherein the at least one processor, in response to awakening into the awake state, is configured to cause at least one component of the communication circuitry to awaken from the sleep state to the awake state, wherein the communication circuitry conveys at least one communication between the cryptocurrency management device and the mobile device while the at least one component of the communication circuitry is in the awake state.

9. The cryptocurrency management device of claim 8, wherein the wireless signal is an NFC signal wirelessly transmitted to the antenna from the mobile device.

10. The cryptocurrency management device of claim 9, wherein the at least one component of the communication circuitry includes an NFC transceiver.

11. The cryptocurrency management device of claim 6, wherein the rectification circuit comprises a full bridge rectifier.

12. The cryptocurrency management device of claim 6, wherein the at least one processor is configured to store at least one private key for use in generating an authenticating signature for a multi-signature address of a cryptocurrency network and perform operations for managing cryptocurrency associated with the multi-signature address, including authorization of at least one transaction for transferring the cryptocurrency.

13. The cryptocurrency management device of claim 6, wherein the activation signal is a digital signal.

14. The cryptocurrency management device of claim 10, wherein the antenna is configured to receive the NFC signal wirelessly from the mobile device;

wherein the NFC signal includes authentication credentials;

wherein, in response to the NFC transceiver awakening into the awake state, the NFC transceiver is configured to receive the NFC signal wirelessly from the antenna;

wherein the NFC transceiver is configured to transmit the NFC signal to the at least one processor; and wherein the at least one processor is configured to authenticate a user of the mobile device based on the authentication credentials from the NFC signal.

15. A method of waking a cryptocurrency management device, comprising:

receiving a first signal wirelessly from a mobile near field communication (NFC) device using an antenna of the cryptocurrency management device while the cryptocurrency management device is in a sleep state;

transmitting the first signal from the antenna to a rectification circuit that is electrically coupled to the antenna automatically in response to receiving the first signal using the antenna;

modifying at least one characteristic of the first signal using the rectification circuit to convert the first signal into an activation signal;

transmitting the activation signal from the rectification circuit to a processor that is electrically coupled to the antenna and the rectification circuit;

causing the processor to awaken the cryptocurrency management device from the sleep state to an awake state responsive to the processor receiving the activation signal, wherein a power consumption by the processor exceeds a threshold while the processor is in the awake state, and wherein the power consumption by the processor is less than the threshold by greater than zero while the processor is in the sleep state; and storing, in a non-transitory computer-readable storage medium coupled to the processor, an indication of receipt of the activation signal.

16. The method of claim 15, further comprising:

causing, using the processor, communication circuitry coupled between the processor and the antenna to awaken from the sleep state to the awake state;

receiving a second signal wirelessly from the mobile NFC device at the antenna;

receiving the second signal from the antenna at the communication circuitry; and transmitting the second signal from the communication circuitry to the processor.

17. The method of claim 16, wherein the second signal includes authentication data and responsive to receiving the authentication data, the processor authenticates a user of the mobile NFC device.

18. The method of claim 17, wherein the second signal includes an NFC signal and the communication circuitry comprises an NFC transceiver.

19. The method of claim 17, wherein the processor stores at least one private key for use in generating an authenticating signature for a multi-signature address of a cryptocurrency network and in response to authenticating the user the processor causes the at least one private key to be transmitted to the mobile NFC device.

20. The method of claim 16, wherein the first signal includes an NFC signal.

\* \* \* \* \*